No. 763,477. PATENTED JUNE 28, 1904.
F. G. GIES.
TRANSMISSION GEAR.
APPLICATION FILED DEC. 18, 1902.
NO MODEL. 2 SHEETS—SHEET 1.

WITNESSES
L. E. Flanders
T. H. Longstaff

INVENTOR
Frank G. Gies,
By Barthel & Barthel
Attorneys.

No. 763,477. PATENTED JUNE 28, 1904.
F. G. GIES.
TRANSMISSION GEAR.
APPLICATION FILED DEC. 18, 1902.
NO MODEL. 2 SHEETS—SHEET 2.
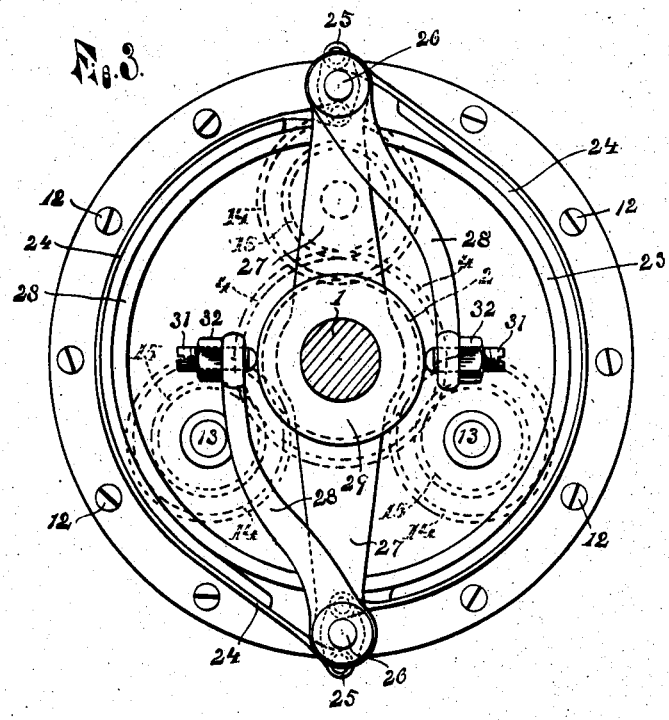
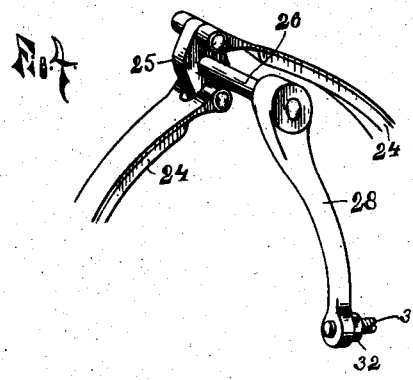
WITNESSES
INVENTOR
Frank G. Gies,
By
Attorneys.

No. 763,477.

Patented June 28, 1904.

UNITED STATES PATENT OFFICE.

FRANK G. GIES, OF DETROIT, MICHIGAN.

TRANSMISSION-GEAR.

SPECIFICATION forming part of Letters Patent No. 763,477, dated June 28, 1904.

Application filed December 18, 1902. Serial No. 135,694. (No model.)

*To all whom it may concern:*

Be it known that I, FRANK G. GIES, a citizen of the United States of America, residing at Detroit, in the county of Wayne and State of Michigan, have invented certain new and useful Improvements in Transmission-Gear, of which the following is a specification, reference being had therein to the accompanying drawings.

My invention relates to improvements in transmission-gearing, and its object is to provide a gearing for transmitting a varying motion to a driven member from a shaft driven at a uniform rate of speed, which gearing is so arranged as to be simple in construction and not liable to get out of order and the gears of which are all within a small space and inclosed within a casing, where they are run in oil.

It is also an object of this invention to provide means for tightening the friction-band, which will operate quickly, positively, and with great force, and to provide the device with certain other new and useful features, all as hereinafter more fully described, reference being had to the accompanying drawings, in which—

Figure 1:
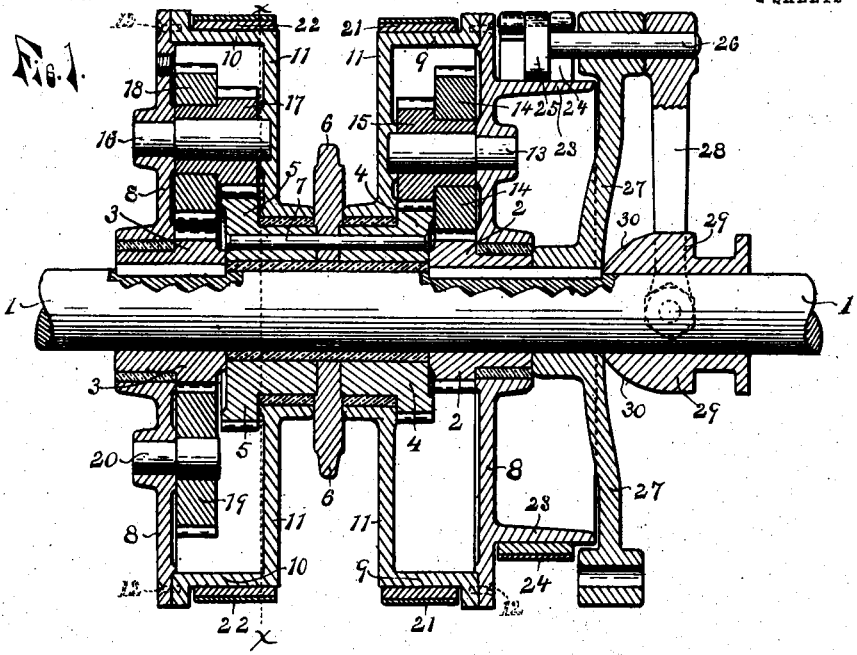
Figure 2:
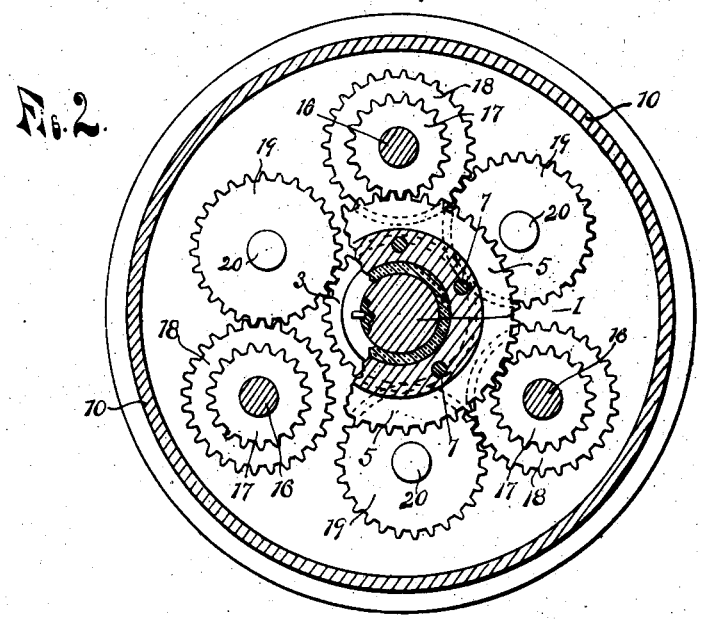

Figure 1 is an axial longitudinal section of a device embodying my invention; Fig. 2, a section on the line *x x* of Fig. 1; Fig. 3, an end elevation, and Fig. 4 a detail, showing in perspective the mechanism for operating the high-speed clutch-bands.

As shown in the drawings, 1 is the driving or engine shaft, upon which are keyed two gears, 2 and 3, at a distance apart, and sleeved upon the shaft between said gears and adjacent thereto are the gears 4 and 5, having extended hubs, between the adjacent ends of which is secured the sprocket-wheel 6 by pins or rivets 7, extending through the hubs and sprocket and riveted down at their ends. Mounted on the outwardly-extending hubs of the gears 2 and 3 and free to turn thereon are the disks 8, each of which form one side wall of each of the casings 9 and 10, and journaled on the hubs of the gears 4 and 5, between said gears and the sprocket-wheel, are the portions 11, forming the other side wall and the rim of each of said casings, said parts 8 and 11 being secured together by the screws or bolts 12.

Secured within suitable bearings in the side walls of the casing 9 are the three stub-shafts 13, upon each of which are mounted to turn freely the gears 14 and 15, said gears being secured together or may be made integral to turn together, the gear 14 in mesh with the gear 2 on the shaft and the gear 15 with the gear 4, carrying the sprocket-wheel.

Similar stub-shafts 16 are provided in the casing 10, upon each of which shafts are mounted the gears 17 and 18, also secured to each other to turn together, the gears 17 being in mesh with the gear 5; but the gears 18 do not engage the gear 3 in the engine-shaft, but are in mesh with the intermediate gears 19, journaled on the stub-shafts 20 on the wall 8 of said casing, said gears 19 being in mesh with the gear 3.

Clutch or friction bands 21 and 22 encircle the casings 9 and 10, respectively, and engage the peripheries of said casings to hold them from turning, and projecting outward from the side wall 8 of the casing 9 is a flange 23, adapted to be engaged by a two-part friction or clutch band 24, the adjacent ends of each part being connected by the links 25, which are pivoted thereto at their ends and are each provided intermediate its ends with a laterally-projecting rock-shaft 26, which rock-shafts extend outward through bearings in the ends of arms 27, keyed to the shaft, and each form a support and pivot for each link. To turn the links to draw the ends of the band toward each other and clamp the flange, curved rock-arms 28 are secured to the outer ends of the rock-shafts 26, and on the engine-shaft is sleeved a sliding cone or wedge-block 29, having an inclined face 30, which when said cone is moved longitudinally on the shaft engages the inner ends of the rock-arms 28 and forces them away from the shaft, thus turning the rock-shafts and links. The inner ends of the said rock-arms are each provided with a contact-pin 31, extending through a screw-threaded opening in said arm, and has a rounded end to engage the cone and is provided with a lock-nut 32.

Full speed ahead or a motion in the same direction as that of the shaft and at the same speed is imparted to the sprocket, the bands 21 and 22 being out of contact with the casings when the band 24 is tightened by the moving of the cone 29 to cause the casing 9 to turn with the engine-shaft, the gears 14 and 15 thus being held from turning by the engagement of the gear 14 with the gear 2, and the gear 4, carrying the sprocket-wheel, is locked by its engagement with the gear 15, thus locking the sprocket to the shaft to give full speed ahead.

When a slow speed ahead is desired, the bands 22 and 24 being released, the band 21 is set up on the casing 9 to firmly hold said casing from turning, said band being attached to any suitable fixed support, (not shown,) and the gears 14 and 15 are then driven by the gear 2 on the engine-shaft, and in turn the gear 15 drives the gear 4, to which the sprocket-wheel is secured, in the same direction in which the shaft is driven, but at about one-half the speed, the gears being proportioned to reduce the speed approximately that amount; but they may be proportioned to transmit any desired rate of speed to the sprocket.

A slow reverse motion is obtained by releasing the bands 21 and 24 and bringing the band 22 firmly into contact with the casing 10 to hold said casing from turning, the band 22 being secured to a suitable fixed support (not shown) the same as band 21. When said casing is held from turning, the gears 17 and 18 are driven by the gear 3 on the engine-shaft through the medium of the intermediate gears 19, and thus the gears 17 drive the gear 5, to which the sprocket-wheel is secured, in a direction opposite to that in which the engine-shaft is driven and at a much lower rate of speed, said gears being proportioned to reduce the velocity of motion.

When all three of the friction-bands are released, the gears 2 and 3 still actuate the gears 14 and 18; but the casings upon which they are supported being free to rotate are carried around by the engagement of the gears 15 and 17 with the gears 4 and 5 instead of actuating said gears and sprocket. In this construction the parts formed with bearings for the gears also form casings, within which the gears are inclosed, said gears being so compactly arranged that but small casings are required, which may be filled with oil or other lubricant, all of the bearings for the casings and gears which are loose on the shaft being babbitted to prevent leakage or wear.

By connecting the ends of the band 24 in the manner described the band is drawn tightly above the flange 23 with but a slight movement of the rock-arms, as both links draw equally upon both ends of the band and but little force is required to move the cone on the shaft to operate the rock-arms owing to the shortness of the links and the leverage of said rock-arms.

Having thus fully described my invention, what I claim is—

1. In a transmission-gearing, the combination, with the driving-shaft, of two gears secured thereon at a distance apart, two gears loose on the shaft between the fixed gears, a sprocket-wheel secured to the loose gears, a rotatable casing at each side of the sprocket and inclosing said gears, gears of different diameters carried by said casings, the gears in one casing being in mesh with both the fixed and loose gears on the shaft in that casing and the gears in the other casing being out of mesh with the fixed gear on the shaft and in mesh with the loose gear, intermediate gears carried by the last-named casing to transmit motion from the fixed gear on the shaft to the gears carried by the casing, friction-bands to engage the said casings and prevent the same from turning, and means for connecting one of said casings to the shaft to turn therewith.

2. In a transmission-gearing, the combination, with the driving-shaft, of gears keyed on the shaft at a distance apart, gears loose on the shaft between the gears keyed on the shaft, a sprocket-wheel secured to the loose gears, a casing loosely mounted on the hubs of and inclosing said gears one at each side of the sprocket-wheel, stub-shafts mounted in bearings in said casings, gears mounted on said stub-shafts and in mesh with the loose gears on the driving-shaft, gears of a greater diameter mounted on said stub-shafts and secured to the smaller gears thereon to turn therewith, intermediate gears interposed between the large gears on the stub-shafts in one of the casings and the fast gear on the driving-shaft, friction-bands adapted to engage the peripheries of said casings and hold the same from turning, and means for connecting one of said casings to the shaft to turn therewith.

In testimony whereof I affix my signature in presence of two witnesses.

FRANK G. GIES.

Witnesses:
OTTO F. BARTHEL,
LEWIS E. FLANDERS.